(12) United States Patent
Shapiro et al.

(10) Patent No.: US 11,440,187 B1
(45) Date of Patent: Sep. 13, 2022

(54) COLLABORATIVE WORKFLOW FOR LABORER AND ROBOTIC SYSTEM TO AUTOMATE WIRE PULLING IN CONSTRUCTION SITES

(71) Applicants: Moshe Shapiro, Herzliya (IL); David Klein, Rehovot (IL)

(72) Inventors: Moshe Shapiro, Herzliya (IL); David Klein, Rehovot (IL)

(*) Notice: Subject to any disclaimer, the term of this patent is extended or adjusted under 35 U.S.C. 154(b) by 0 days.

(21) Appl. No.: 17/571,489

(22) Filed: Jan. 9, 2022

Related U.S. Application Data

(60) Provisional application No. 63/174,557, filed on Apr. 14, 2021, provisional application No. 63/233,287, filed on Aug. 15, 2021.

(51) Int. Cl.
| | |
|---|---|
| *B25J 5/00* | (2006.01) |
| *B25J 9/16* | (2006.01) |
| *B25J 11/00* | (2006.01) |

(52) U.S. Cl.
CPC .......... *B25J 9/1664* (2013.01); *B25J 11/005* (2013.01)

(58) Field of Classification Search
CPC .............. G06Q 50/30; G06Q 10/0832; G06Q 30/0633; G06Q 10/087; B25J 19/04; B25J 11/008; B25J 9/1679; B25J 19/0054; B25J 19/061; B25J 9/0009; B25J 5/007; B25J 19/022; B25J 15/0608; B25J 9/1697; B25J 15/0616; B25J 19/023; B25J 15/06; B25J 15/0028; B66F 9/065; B66F 9/07; B66F 9/063; B65G 1/1373; B65G 1/0492; B65G 2209/10; Y10S 901/01
See application file for complete search history.

(56) References Cited

U.S. PATENT DOCUMENTS

| | | | | |
|---|---|---|---|---|
| 10,332,065 | B2* | 6/2019 | Ferguson | ................ B60R 25/25 |
| 10,549,915 | B1* | 2/2020 | Theobald | ............. G05D 1/0088 |
| 11,164,273 | B2* | 11/2021 | Heinla | ............... G06Q 10/0832 |
| 11,200,532 | B2* | 12/2021 | Peterson | ............. G05D 1/0212 |
| 11,235,890 | B1* | 2/2022 | Dahlstrom | ............. B64D 47/08 |
| 2018/0104829 | A1* | 4/2018 | Altman | .................... B25J 9/162 |
| 2019/0362295 | A1* | 11/2019 | Kanitz | ...................... B60S 1/64 |
| 2020/0209821 | A1* | 7/2020 | Heinla | ................... G06Q 20/18 |

OTHER PUBLICATIONS

Davies et al., Tarzan: Design, Prototyping, and Testing of a Wire-Borne Brachiating Robot, 2018, IEEE, p. 769-7614 (Year: 2018).*

* cited by examiner

*Primary Examiner* — McDieunel Marc
(74) *Attorney, Agent, or Firm* — Dekel Patent Ltd.; David Klein

(57) ABSTRACT

A robotic system includes a plurality of robotic systems, each mounted by a plurality of sensors and SW processors all enabling arm manipulation to automate a construction process and/or navigating and/or maneuvering in a construction site. The system can interact with a centralized backend algorithm, which has access to the construction site's digital building plan from which a route on which the robots must be dropped off is deduced. The route may be displayed to a laborer, walking through the site according to the route, who can deploy the robots to perform their automated construction task.

16 Claims, 5 Drawing Sheets

COLLABORATIVE WORKFLOW FOR LABORER AND ROBOTIC SYSTEM TO AUTOMATE WIRE PULLING IN CONSTRUCTION SITES

FIELD OF THE INVENTION

The present invention relates generally to a workflow to be carried out by a laborer and a robotic system for automating the process of wire pulling through conduit pipes in construction sites.

BACKGROUND OF THE INVENTION

During daily work on a construction site, an electrical workman spends a great deal of time and effort pulling electrical wires or data cables through preinstalled pipes which have been placed in an earlier stage of the construction.

Currently a pair of workmen typically pull wire together. The first stands beside the first electrical spot and the other at the other end of the preinstalled pipe. One of them pushes in "fish-tape" (a flexible guide wire), which bends and "snakes" through the pipe until it reaches the other workman who connects the necessary wires to be installed to the fish tape and signals the first workman to pull it back. The first workman pulls back the fish-tape along with the connected wires until the wires reach the first side.

The procedure can take much effort and is prone to negative effects because a) there may be vast amounts of electrical lines to wire, especially in large buildings, b) typically this operation requires a pair of workmen, c) long term health effects and injuries of workmen doing this type of repetitive work are common.

In addition, it has become difficult to attain skilled workmen to perform manual labor on construction sites throughout the developed world due to low paying and labor intensive jobs and the young population would rather find opportunities in "cleaner" and safer work environments.

SUMMARY OF THE INVENTION

The present invention seeks to provide a collaborative workflow, between laborers and a robotic system, as is described more in detail below to automate electrical wire, data cables, etc. (all referred to as wires) pulling through conduit pipes.

A laborer (the 'operator') walks through the construction site, leading mobile equipment (the 'mobile equipment') such as man lifts, terrestrial vehicles (manually or autonomously guided) etc., while following a 'drop-off route' (the 'route') proposed to him by the robotics system's centralized backend (the 'backend') which deduces it from the construction site's digital information available to the backend, according to some priority mechanism defined to the system such as minimal walk, minimal time or specific line priority etc.

A plurality of autonomous robotic systems (the 'robots') including sensors, arm manipulators and specifically designed mechanical parts which shall later enable the action of wire pulling as described below, are mounted on the mobile equipment.

There may be different versions of these robots, such as but not limited to, the first holding the 'fish-tape' (the 'FT side'), the other carrying the electrical wires (the 'wire side') and a 'bridge robot' for continuation of sections.

At each electrical point, without limitation, the operator shall: a) fix the mobile equipment and elevate the man lift, b) remotely, from the ground for instance, direct the robots extension arm to the precise pipe entrance which must be served, by visual indication, as described below and c) visually verify the robot's FT or wire feed is correctly deployed for the wire pulling.

Once both 'FT' and 'wire' side robots are in place an autonomous wire pulling action can be executed and once finished the robots will wait for the operator and rejoin him to their next task.

Visual guidance of the robot to the precise pipe entrance may be done by manual monitoring of the robot's image captures, pausing the robot if needed for the operator to verify the correct pipe entrance to be served, by for instance, reviewing digital information provided by the backend such as CAD drawings of the connection boxes, pipe bundles, etc. The indication to the robot can be done by manually marking the correct spot on the image capture the robot must target. This reduces the complexity of the robot's decision which pipe to serve, which may be difficult due to a) robot's pose and location estimation error, b) uncertainty regarding the match between 'planned' model and 'as-built' reality, with respect to pipe layout and c) difficulty to correctly identify the pipe entrances in a 3D space.

In many cases, the lines of wires to be pulled must be done in sections through which sometimes different wire types must be pulled. For instance, thin gage wires must be pulled from point A (the 'feed point') to point B but thicker wires must continue to point C. In some cases, at point B (the 'bridge point') the lines must split, and thick gage wires must continue to a plurality of destinations ('end points', i.e., points C, D, E, etc.). This situation results in section AB containing a mixture of wires, thick and thin gage, some destined to the bridge point and others to further end points.

This invention proposes to locate a 'FT side' robot equipped with additional HW enabling the continuation of the wire pulling to the end points (a 'bridge' robot), at the bridge point. Additional 'FT side' robots shall be positioned at the end points to complete the pulling continuation form the bridge to end points.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
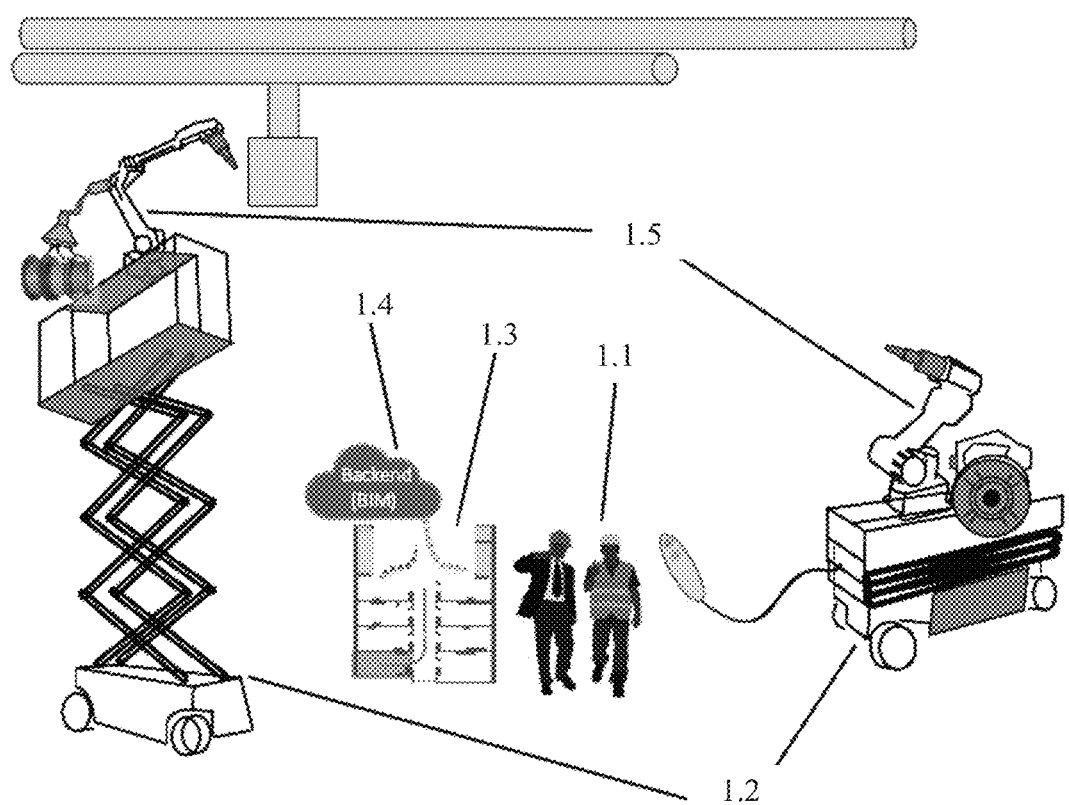
FIG. 1 is a simplified illustration of the initial part of the workflow in which the operator leads manlifts, mounted with robots, though the construction site, guided by a the backend which is connected to the building's digital information.

Reference is now made to FIG. 1, which illustrates a laborer who is the operator 1.1 of the robotic systems 1.5, leading the mobile equipment (such as a manlift), walking within the construction site going through electrical spots requiring wire pulling. The operator 1.1 follows a predefined route 1.3 provided by the 'systems backend' 1.4 which is capable of calculating an optimal route 1.3 on which to drop off the mobile equipment 1.2 mounted by the robots 1.5, depending on their type, the required electrical points to pull wire through, minimal walk for the operator or even physical availability (with respect to other robots working on the same site).

In FIG. 1:

1.1—The operator walking through the site, deploying man lifts, according to the 'drop off route'

1.2—Manlifts or other mobile equipment the operator leads through the site

1.3—A 'drop off route' provided and interacting with the operator (via some interface)

1.4 The 'Backend' (where part of the systems SW is executed) provides the 'drop off route' deduced from available digital building plans

1.5—The robots mounted on manlifts.

Figure 2:
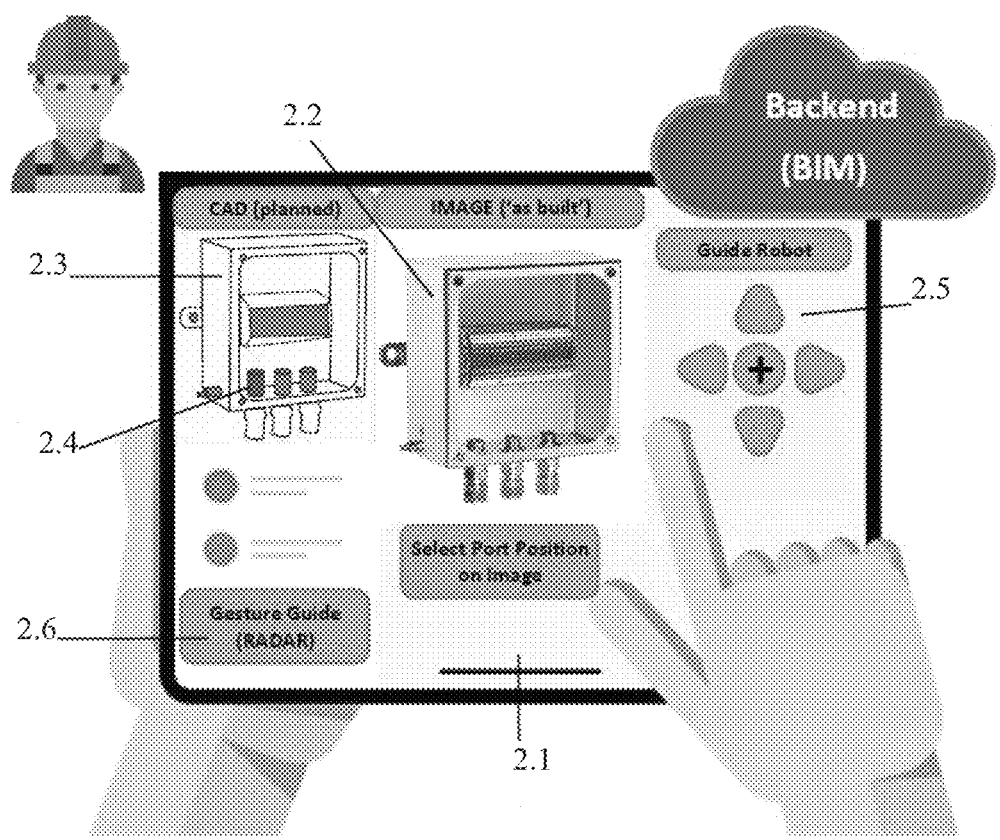
FIG. 2 is a simplified illustration of the second step of the workflow in which the operator may guide the robot to the precise electrical port to be served.

Reference is now made to FIG. 2, which illustrates how the operator interacting with some GUI 2.1 can guide the robots to the precise electrical port requiring the wire pulling action. The GUI 1 displays both an image of the robot's real time visual capture 2.2 and images deduced from the building information model (BIM) 2.3, such as CAD of planned junction boxes, conduit pipe bundles of even structural reconstructions or simulations. These deduced images 2.3 are displayed to indicate to the operator, which are the landmarks of interest to which the robot must be guided, such as a specific junction box port 4 or a specific pipe within a bundle. Both images 2.2 and 2.3 may be fully or partially registered since once the operator identifies the correct landmark in the planned images 2.3, he may indicate to the robot where it is on its' visual capture 2.2. This stage may help the robot since it mitigates the necessity to associate each landmark in the acquired image 2.2, to the landmarks of interest in the planned model CAD 2.3 and can then use these landmarks to accurately maneuver to the desired position without resolving 'planned vs. as-built' mismatches.

A button pad 2.5 may also be used to manually control the robot bringing it to the desired position required to pull the wire.

A 'gesture recognition sensor', such as a "soli RADAR", which may interface from a GUI panel 2.6, can be utilized by the robot to identify complex physical maneuvers the operator may demonstrate to the robot he would want it to execute.

In FIG. 2:

2.1—A mobile device through which the operator can interface with the robots and backend

2.2—The robots live visual capture, presented to the operator. The operator can indicate a specific landmark by touching the image

2.3—CAD or other assistive information related to the visual image the robot is currently presenting

2.4—The precise electrical port to be served, as intended by the backend

2.5—A manual control panned of the robot's arm

2.6—a 'gesture recognition' guide, of the robot. Can be visual or RADAR based Reference is now made to FIG. 3, which illustrates robots 3.1 and 3.2 divided into two subtypes: a 'fish tape (FT) side' and a 'wire side' robot, respectively. The FT side robot 3.1 may consist of: a) a motor driven FT cassette 3.3, which can automatically push or pull the 'fish-tape' through a conduit pipe 6 and b) a robotic arm 3.4 through or along which the FT shall propagate and c) a dedicated feed 3.5 designed to adapt the FT to the pipe entrance. The wire side robot 3.2 can include a similar set of arm manipulator 3.4 and feed 3.5 in addition to: a) a connecting device 3.7, appending the required wires to the incoming FT 3.6, according to the backend's intent and b) an array of electrical wires 3.8 available to the robot to be connected to the incoming FT.

Figure 3:
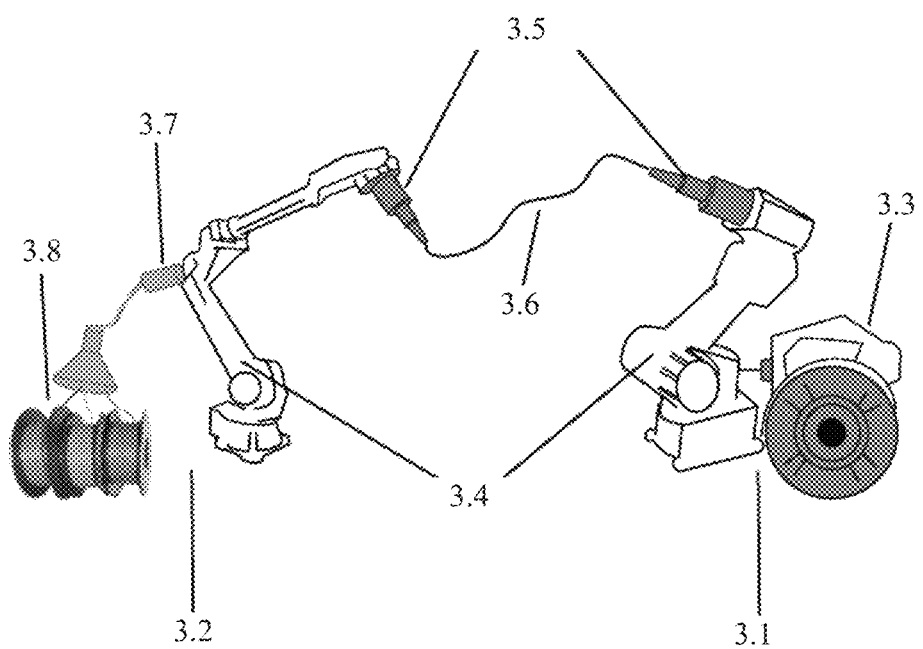
FIG. 3 is a simplified illustration of the 'fish-tape side' (FT side) and the 'wire side' versions of the robots.

In FIG. 3:

3.1—the 'fish-tape side' (FT) side version of the robot

3.2—the 'wire side' version of the robot

3.3—an interchangeable wire pulling system, consisting of a FT drum and motors to push/pull it through conduit pipes

3.4—robotic arm through, or along which the fish tape or wires may propagate

3.5—a mechanical adaptor to accurately feed the port's entrance

3.6 fish tape pushed/pulled through the pipes

3.7—a connecting device, appending the required wires to the incoming FT, according to the backend's intent

3.8—an array of electrical wires available to the robot

Figure 4:
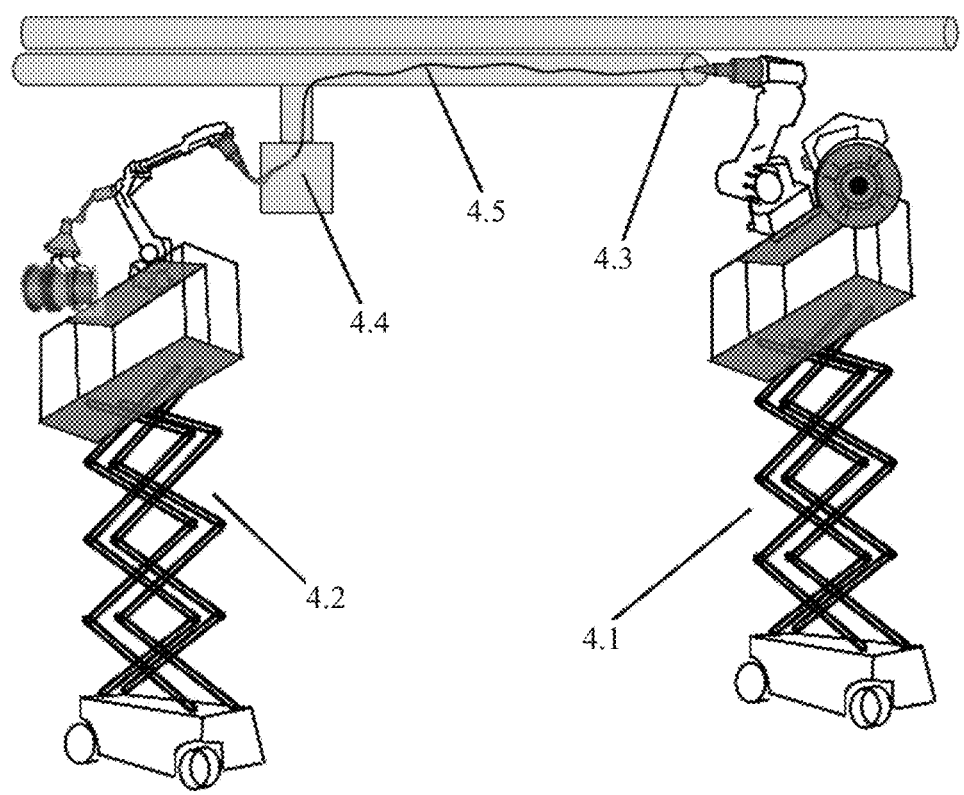
FIG. 4 is a simplified illustration of the third step of the workflow in which the robots execute an autonomous wire pulling action and once finished will disconnect the pulled wires and wait for the operator to lead them to the next task.

Reference is now made to FIG. 4, which illustrates how systems 4.1 and 4.2 (both robots and manlifts) autonomously push FT 4.5 and later pulling electrical wire from the conduit pipe entrance 4.3 to a specific port in junction box 4.4.

In FIG. 4:

4.1—the FT side version of the robot, mounted on a manlift

4.2—the 'wire side' version of the robot, mounted on a manlift

4.3—conduit pipe port.

4.4—junction box

4.5—FT or wire propagating through conduit pipe

Figure 5:
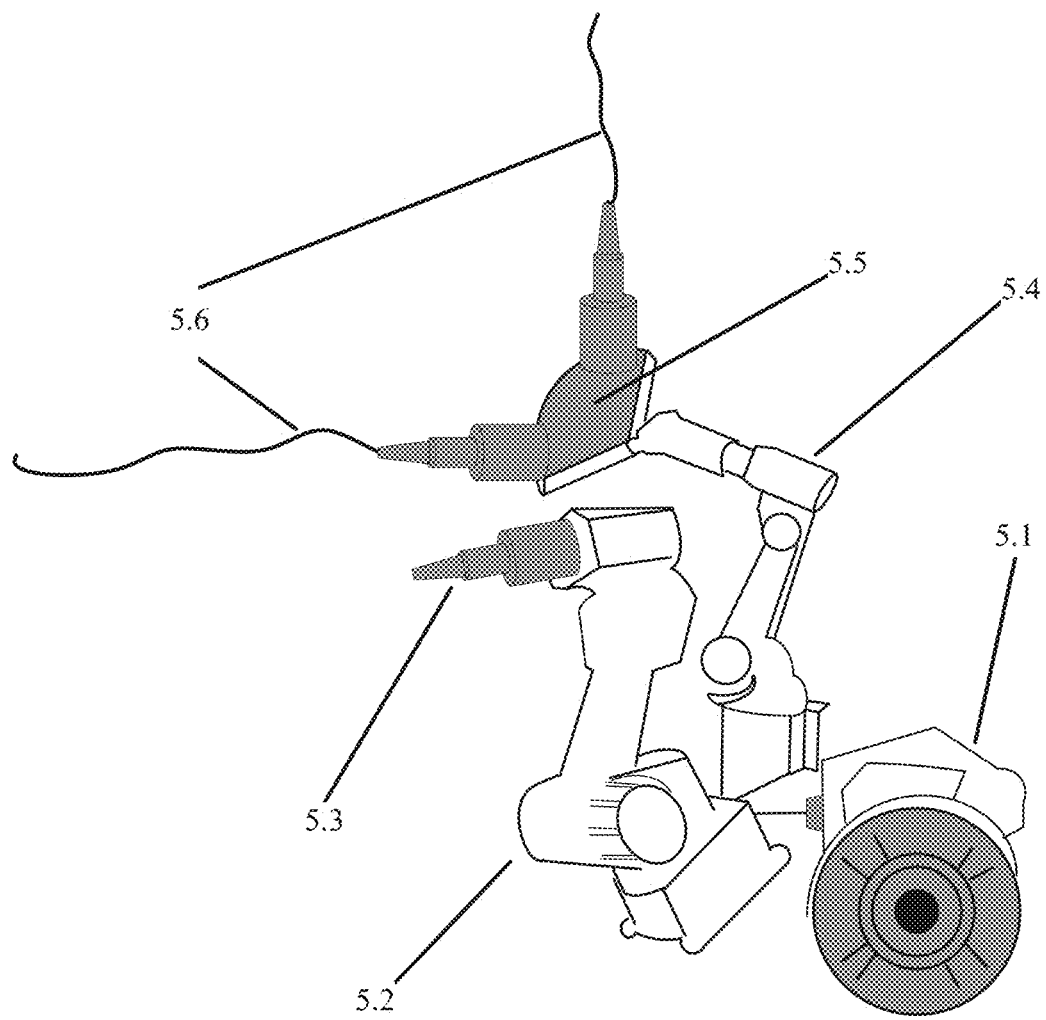
FIG. 5 is a simplified illustration of the optional bridge robot enabling the continuation of wire pulling upon sections.

Reference is now made to FIG. 5, which illustrates a 'bridge' robot which may consist of: a) a motor driven FT cassette 5.1, which can automatically push or pull the 'fish-tape' wire through a conduit pipe and b) a robotic arm 5.2 through or along which the FT shall propagate and c) a dedicated feed 5.3 designed to adapt the FT to the pipe entrance and d) an additional robotic arm positioning dedicated HW necessary to connect pipe segments and e) additional HW through, or along which the fish tape, and/or pulling rope or string ropes or wires or electrical wires 5.6 may propagate or be connected, enabling continuation of pipe segments.

In FIG. 5:

5.1—an interchangeable wire pulling system, consisting of a FT drum and motors to push/pull it through conduit pipes

5.2—robotic arm through, or along which the fish tape or wires may propagate

Figure 6:
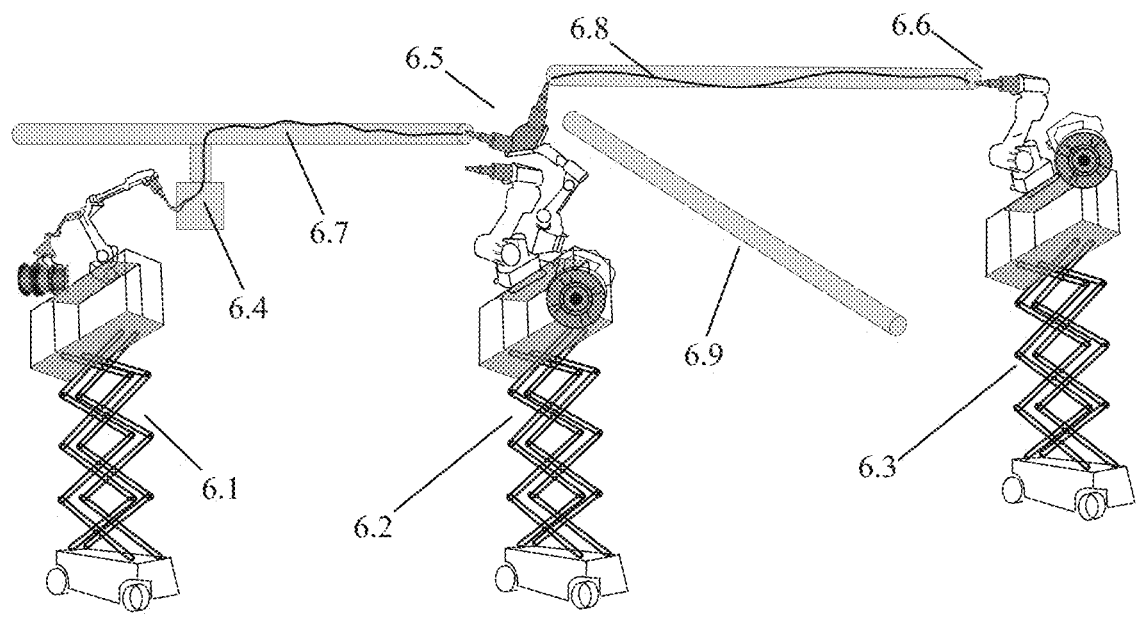
FIG. 6 is a simplified illustration of an optional step of the workflow in which the robots execute an autonomous wire pulling action through sections of conduit pipes.

5.3—a mechanical adaptor to accurately feed the port's entrance 5.4—an additional robotic arm positioning dedicated HW necessary to connect pipe segments 5.5—additional HW through, or along which the fish tape, string wires or electrical wires may propagate or be connected, enabling continuation of pipe segments 5.6—connected fish tape or string wires or continuous wire segments running from one pipe segment to another Reference is now made to FIG. 6, which illustrates the 'wire side' 6.1, 'bridge' 6.2 and 'FT side' 6.3 robots, respectively, autonomously pushing FT or string wire and later pulling continuous electrical wires through segmented lines of conduit pipe 6.7, 6.8. The segmented line goes from the 'feed point' 6.4, thought the 'bridge point' 6.5 and continuing to the 'end point' 6.6. The figure also shows an additional segment of pipe 6.9 which may be later fed with the wires coming from the 'feed' point 6.4, going through the 'bridge' point 6.5 and destined to an additional 'end' point, at the end of conduit pipe 6.9.

Figure 7:
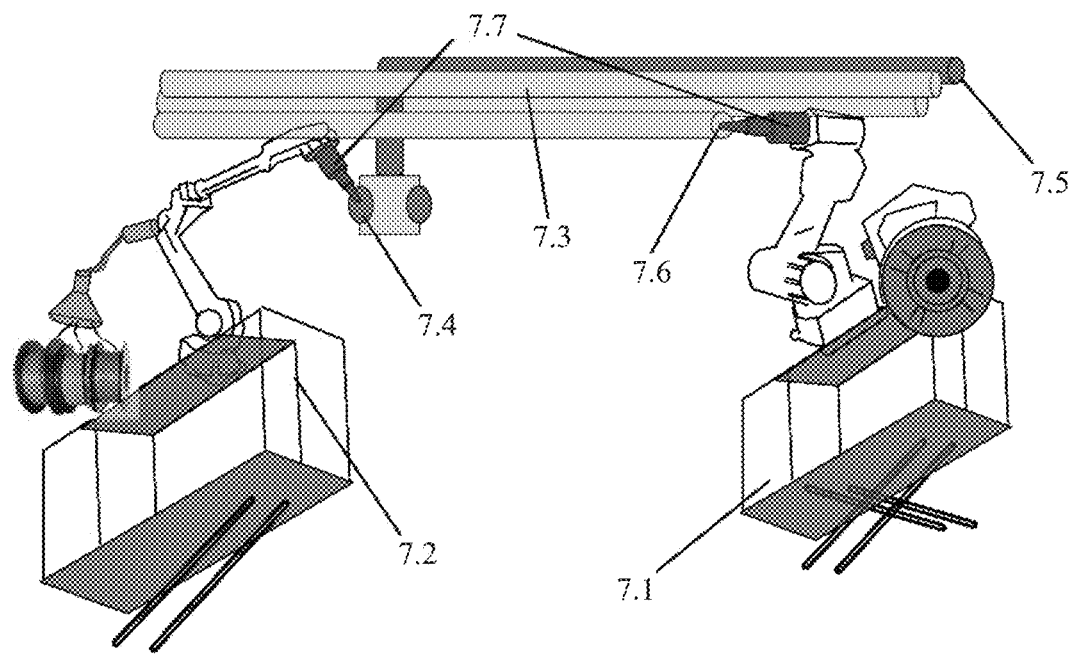
FIG. 7 is a simplified illustration of a method in which the robots may automatically identify the correct pipe to which the 'wire side' robot must connect.

In FIG. 6:

6.1—the 'wire side' version of the robot, mounted on a manlift 6.2—the 'bridge' version of the robot, mounted on a manlift 6.3—the 'FT side' version of the robot, mounted on a manlift 6.4—point A of the segmented pipe wire line the 'feed' point 6.5—point B of the segmented pipe wire line the 'bridge' point 6.6—point C of the segmented pipe wire line the 'end' point 6.7—the first segment of pipe in which a mixture of wires may run, some destined to the 'bridge' point and others to 'end' points 6.8—a second segment of pipe in which wires coming from the 'feed' point, going through the 'bridge' point and destined to the 'end' point, must be pulled 6.9—an additional segment of pipe in which wires coming from the 'feed' point, going through the 'bridge' point and destined to an additional 'end' point, must be pulled Reference is now made to FIG. 7, which illustrates how robots 7.1 and 7.2 may automatically identify the correct pipe that must be serviced, according to the backend's route, to which the robot must attach, from within a bundle of pipes 7.3, if the available BIM model is ambiguous. In the figure the wire side robot 7.1 is fixed at the entrance to a pipe 7.4 which ends in the conduit pipe exit, to which the system intended the FT side robot 7.2 to be connected. Instead, robot 7.2 is falsely connected to some other conduit pipe exit 7.6. At the tips of robots 7.1 and 7.2, an RF, acoustic or illuminative transceiver 7.7 can be installed, inserted into the correct pipe ports 7.4, 7.5, which can be used to signal the other robot and identify erroneous situations as illustrated in the figure.

In FIG. 7:

7.1—the 'fish-tape side' FT side version of the robot, mounted on a manlift 7.2—the 'wire side' version of the robot, mounted on a manlift 7.3—a bundle of conduit pipes 7.4—A junction box port which is the entrance to the pipe that must be wired 7.5—A conduit pipe entrance which is the exit of the pipe that must be wired 7.6—A conduit pipe entrance which the FT side robot falsely identified as the exit of the pipe that must be wired 7.7—a transceiver of some acoustic, RF or lighting signal mounted on the robot's tip, inserted into the port Much of the hardware and software associated with the tasks above are commercially available (i.e. "off the shelf" with adaptation) or "open sourced" (which required SW integration) and can be used to construct the robots and carry out the above described structure and methods of using it. The system has an internal processor (not described in the figures) that is used to a) process sensor data, b) localize the system with respect to the operator, c) plan trajectory and motion control following the operator, d) enable external communication and interface with users and backend and e) operate internal components and run SW associated with the wire pulling action.

What is claimed is:

1. A system comprising:
    at least one robot comprising a maneuvering assembly that comprises at least one actuator and at least one sensor coupled to a processor for maneuvering said at least one robot at a construction site;
    an electrical wire pulling unit coupled to said robot, wherein said processor is configured to control said electrical wire pulling unit to pull electrical wire from one place to another place in said construction site to another.

2. The system according to claim 1, wherein said processor defines a route along which said at least one robot moves at said construction site.

3. The system according to claim 2, wherein said processor defines said route by optimizing said route to reduce time of travel of said at least one robot.

4. The system according to claim 2, wherein said processor defines said route by optimizing said route to reduce an amount of wire pulls performed by said electrical wire pulling unit.

5. The system according to claim 2, wherein said processor defines said route by taking into account positions of conduit pipe entrances at said construction site.

6. The system according to claim 2, wherein said processor defines said route by taking into account positions of junction box ports at said construction site.

7. The system according to claim 2, wherein said processor defines said route by taking into different types of wires for pulling by said electrical wire pulling unit.

8. The system according to claim 1, wherein said electrical wire pulling unit is configured to manipulate electrical fish tape, or string wire or rope or pulling rope, through a pipe or conduit.

9. The system according to claim 1, further comprising:
    a plurality of robotic systems, each mounted by a plurality of sensors and SW processors all enabling arm manipulation to automate construction process and/or navigating and/or maneuvering in a construction site; and means to interact with a centralized backend algorithm, which has access to the construction site's digital building plan from which, a route on which the robots must be dropped off, is deduced; and means to display this route to a laborer, walking through the site according to the route, leading the mobile equipment in order to deploy the robots to perform their automated construction task.

10. The system according to claim 9, wherein the robots are not mounted on external mobile equipment but are rather capable of autonomously following a laborer indicating specific landmarks, the robot must identify or reach.

11. The system according to claim 9, wherein the construction task is an action of electrical wire pulling through pre-installed pipes and the electrical spot to be served, which may be a conduit pipe entrance or a junction box port, is located overhead, occluded or positioned near floor level and for this case a dedicated arm manipulator through or along which electrical 'fish tape' can be pushed or electrical wire may be pulled, is designed; the electrical wires mentioned above may be electrical power conductors, data cables or other wires to be pulled through pre-installed pipes.

12. The system according to claim 9, wherein the construction task is an action of electrical wire pulling through pre-installed pipes and the electrical spot to be served, which may be a conduit pipe entrance or a junction box port, is located overhead, occluded or positioned near floor level and for this case a robotic arm manipulates electrical 'fish tape' in pushing into the pipe or manipulates electrical wire in pulling through the pipe, is utilized; the electrical wires mentioned above may be electrical power conductors, data cables or other wires to be pulled through pre-installed pipes.

13. The system according to claim 12, wherein a plurality of sensors are installed on the arm manipulator in order to present this sensor's data to the laborer who then may guide the robot to the correct and precise spot to be serviced, according to the route plan, by marking landmarks on a 3D image space referenced to the sensor data or manually controlling its maneuver.

14. The system according to claim 13, wherein a gesture recognition system may be used to identify manual maneuvers the laborer may perform, in front of the sensor, which he would want the arm to perform to better access the port to be serviced.

15. The system according to claim 12, wherein a method to identify a specific pipe entrance, from within a bundle of pipes, is required and may be done by installing an acoustic, RF or illuminative device on both tips of the robotic arms, fed in or in proximity to the pipe entrances, on each side of the pipe, and are capable of signaling each other to confirm the correct position of the robots is attained according to the route plan.

16. The system according to claim 12, wherein a method to pull continuous electrical wire through a segmented line of conduit pipe is enabled by an additional robot located near the line's discontinuity point, manipulating electrical fish tape and/or string rope or wire and/or pulling rope and electrical wires.

* * * * *